United States Patent [19]
Blaszyk et al.

[11] Patent Number: 5,492,281
[45] Date of Patent: Feb. 20, 1996

[54] BASE LAYER OF COATED GLASS FIBER FOR A BOBBIN

[75] Inventors: Paul E. Blaszyk, Big Flats; Gary L. Fish, Painted Post; Glenda R. Washburn, Beaver Dams, all of N.Y.

[73] Assignee: Corning Incorporated

[21] Appl. No.: 130,760

[22] Filed: Oct. 4, 1993

[51] Int. Cl.$^6$ .......................... B65H 18/28; B65H 75/02; B65H 81/00; G02B 6/02
[52] U.S. Cl. ................. 242/159; 242/118; 242/602.1; 242/610.4; 156/172; 385/128
[58] Field of Search .................... 242/159, 164, 242/118.32, 118, 602.1, 610.4; 156/172; 385/124, 128, 134, 137

[56] References Cited

U.S. PATENT DOCUMENTS

| | | | |
|---|---|---|---|
| 4,472,019 | 9/1984 | Bishop et al. | 385/128 |
| 4,792,347 | 12/1988 | Deneka et al. | |
| 4,950,049 | 8/1990 | Darsey et al. | |
| 4,957,344 | 9/1990 | Chesler et al. | |
| 4,995,698 | 2/1991 | Myers. | |
| 5,022,602 | 6/1991 | LoStracco | 242/159 |
| 5,029,960 | 7/1991 | Hulderman et al. | |
| 5,058,987 | 10/1991 | Hosoya | 385/124 X |
| 5,067,665 | 11/1991 | LoStracco et al. | 242/159 X |
| 5,125,590 | 6/1992 | LeCompte. | |
| 5,146,531 | 9/1992 | Shustack | 385/128 |
| 5,154,366 | 10/1992 | LeCompte | 242/159 X |
| 5,161,208 | 11/1992 | Christie et al. | 385/128 |
| 5,199,098 | 3/1993 | Nolan et al. | 385/128 |
| 5,220,632 | 6/1993 | LoStracco | 385/134 |
| 5,221,060 | 6/1993 | Couvillion et al. | 242/159 |
| 5,257,339 | 10/1993 | Darsey | 385/128 |
| 5,268,984 | 12/1993 | Hosoya et al. | 385/128 |

FOREIGN PATENT DOCUMENTS 295973  12/1986  Japan ....................... 242/159

*Primary Examiner*—John P. Darling
*Assistant Examiner*—Michael R. Mansen
*Attorney, Agent, or Firm*—William J. Chervenak

[57] ABSTRACT

A bobbin for holding a filament pack having a base layer wound of optical waveguide fiber. A method for winding the base layer on the bobbin base is disclosed.

The optical waveguide base layer closely matches the properties of the glass and coating of the optical waveguide which makes up the filament pack. Thus, the long term stability of the filament pack is enhanced. Examples are given in which bobbins incorporating the inventive base layer were successfully unwound at high speed.

8 Claims, 1 Drawing Sheet

FIG. 1a
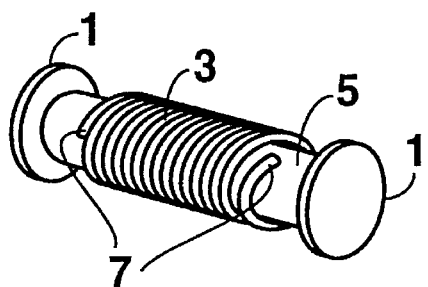
FIG. 1b
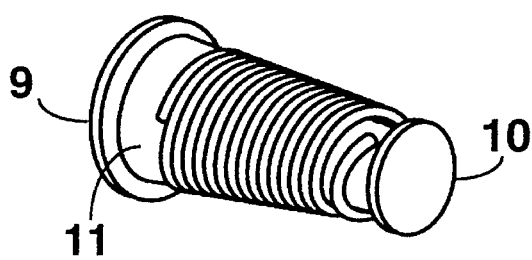
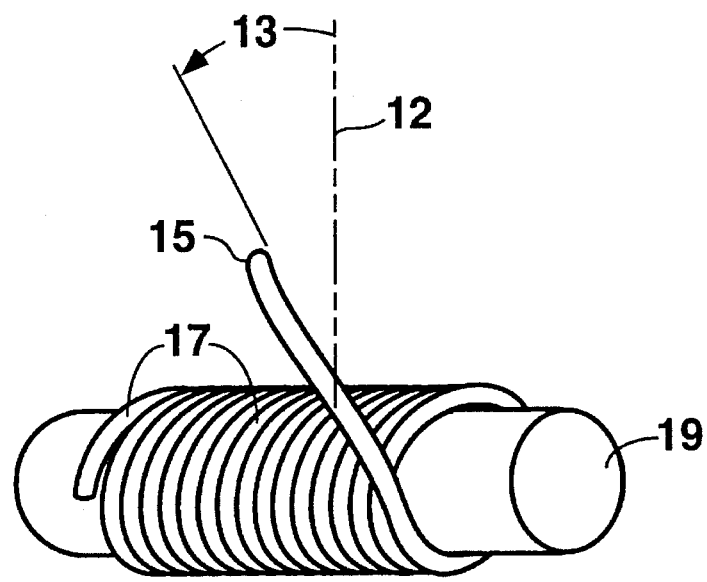
FIG. 2

BASE LAYER OF COATED GLASS FIBER FOR A BOBBIN

FIELD OF THE INVENTION

This invention relates to a bobbin for holding a filament pack. More particularly, the invention relates to a method of winding a base layer for a bobbin and a bobbin base layer comprising a glass filament having a polymer coating.

BACKGROUND

The wide variety of uses for optical waveguide fiber dictates a corresponding variety of packaging for the waveguide. Perhaps the most familiar package is the optical waveguide cable commonly used for telecommunications, network and data applications. In these cases, the waveguide is usually deployed linearly, to cover the greatest distance with the smallest number of meters of waveguide.

However, for certain sensor applications, such as gyroscopes, for various tethered, remotely controlled devices, such as missiles, and for specialty applications, such as dispersion compensating waveguide fiber or delay lines, the desired package takes a much different form. In these applications, a length of optical waveguide fiber is wound onto a bobbin in a configuration usually comprising layers of fiber. This configuration is termed a filament pack. The filament pack must be wound such that key fiber properties, e.g., attenuation and fatigue resistance, are not compromised. Furthermore, fiber properties must remain essentially unchanged for extended periods of time over a range of environmental conditions including, temperature and humidity excursions, vibration and rough handling.

The stability of the filament pack is especially important in applications where the fiber must be unwound after a period of storage. For example, in a tethered weapon application, the filament pack remains on the bobbin for an indefinite period of time, and may be located on an aircraft or land vehicle and thus subjected to abrupt accelerations and wide ranges of temperature and humidity. Also, in tethered missile applications, unwinding speeds can be more than 200 meters per second.

It has been found that stability of waveguide fiber optical and mechanical properties is improved when a base layer is wound on the bobbin base, i.e., the elongated portion of the bobbin which supports the filament pack, prior to winding the filament pack. A base layer is the first layer to be wound on the bobbin base and serves to control spacing and pitch of the subsequent wound layers of the filament pack.

In the prior art a typical base layer is a series of contiguous coils of wire wound upon the bobbin surface. U.S. Pat. No. 4,995,698, Meyers, U.S. Pat. No. 4,957,344, Chesler et al., and U.S. Pat. No. 4,950,049, Darsey et al., are examples of bobbin winding art relating to a wire base layer used in conjunction with an optical waveguide filament pack. Because the base layer determines the pitch and spacing of the filament wound thereon, the base layer wire must have a diameter tolerance of about 3–6 microns. Further, the base layer winding must be uniform in tension, the coils must abut one another and the wire must be free from dirt particles. Since the wire winding tension is typically very different from the filament pack winding tension, a dedicated winding machine is usually required. Essentially continuous side pressure must be exerted on the wire during winding to insure close abutment of the wire coils. Also, the wire usually must be cleaned before winding. Further, the process of making precision diameter wire is costly. Thus, a strategy employing wire as a base layer is expensive in terms of capital, cash flow and labor.

The large difference in thermal coefficient of expansion, between wire and the filament wound thereon, may cause filament pack instability when the filament pack is subjected to temperature excursions. A typical temperature specification may cover the range −40° to more than +65° C.

To address these deficiencies, a compliant base layer which more nearly matches the properties of the filament buffer has been proposed. U.S. Pat. No. 5,029,960, Hulderman et al., is directed to a base layer of silicone. U.S. Pat. No. 5,125,590 teaches the use of an elastomer base layer together with spring loaded bobbin flanges which press against the filament pack.

However, in both of these strategies, additional steps are added to the bobbin preparation and winding process. Also, the base layer is smooth in both cases and so cannot serve as a template for pitch and spacing of the wound filament pack.

A further complication in developing a strategy to maintain filament stability is introduced if the polymer coating of optical fibers in the filament pack changes dimension after winding, perhaps due to the absorption or evolution of gaseous or liquid materials.

Therefore, there is a need for a base layer which isolates the filament pack from dimension changes of the bobbin, which matches the expansion coefficient of the filament pack, which serves as a template for spacing and pitch of the filament pack windings and which compensates for filament pack dimension changes due to absorption or desorption of gaseous or liquid material.

SUMMARY OF THE INVENTION

The present invention overcomes the drawbacks of the prior art and meets the need, described above, for a base layer which provides improved filament pack stability.

A first aspect of the invention is a bobbin, having a base for holding a filament pack. Attached to the base and spaced apart are means for limiting the axial extent of the filament pack. Wound upon the base as the first layer is a glass filament having at least one coating of resilient material. This first layer on the bobbin base is referred to as the base layer.

In an embodiment of this first aspect of the invention, the base layer filament diameter is between about 1.005 and 1.10 times the diameter of a filament of the filament pack. The modules of the outermost coating of the base layer filament is between about 500 and 1800 MPa.

In a preferred embodiment of this first aspect of the invention the diameter of the base layer filament is between about 1.01 and 1.02 times the diameter of a filament in the filament pack. The diameter of the coated base layer filament is controlled to within about ±6% of the target diameter of the base layer filament.

In a further preferred embodiment, the outermost coating of the base layer is a UV curable acrylate. The acrylate is chosen so that a change in dimension of the base layer coating compared to the change in dimension of the coating of a filament of the filament pack, due to the absorption or desorption of a liquid or a vapor material, is small enough that the integrity of the filament pack is maintained and no changes in optical or mechanical properties of the filament pack occur. Also the thermal expansion coefficient of the base layer filament is essentially the same as that of a filament of the filament pack.

Another aspect of the invention is a method for forming a base layer on a bobbin having a base for holding a filament pack and having means positioned on the base and spaced apart to limit the axial extent of the filament pack. The method comprises the steps:

attaching one end of a coated filament to a part of the bobbin;

winding contiguous coils of the filament on the base, thereby forming a single layer of filament which essentially covers the portion of the base included between the spaced apart holding means; and attaching the other end of the filament to a part of the bobbin.

During the winding of the base layer a substantially constant tension is maintained in the base layer filament, the tension being sufficient to insure that the coils of the base layer conform to the shape of the base surface. A force substantially parallel to the base surface is exerted on the base layer filament as it is wound onto the base so that the coils of the base layer firmly abut one another without appreciable deformation of the coating. This force may be exerted by a tool pressing the coils together or the force may be exerted by positioning the free portion of the filament to diagonally intersect about five coils on the bobbin base. Referring to FIG. 2, free end 15 makes angle 13 with line 12 which is perpendicular to the long axis centerline of base 19.

In an embodiment of the method, a winding tension between about 50 and 150 grams is used and the angle of free end 15 relative to the coil plane 12 is in the range of about 0.1 to 0.5 degrees.

In another embodiment of the method, an adhesive is applied to the base prior to winding the base layer filament. The adhesive may be neoprene, acrylate or epoxy. In an embodiment of the method which includes the bobbin of example 1, termed the aluminum bobbin, about 20 ml of adhesive is sprayed on each layer of the filament pack and on the bobbin base before winding of the base layer.

BRIEF DESCRIPTION OF THE DRAWINGS

FIG. 1a and FIG. 1b are perspective drawings of two embodiments of the bobbin, showing the base and the base layer.

FIG. 2 is a perspective drawing showing the bobbin base, a portion of the base layer, and the angle between the free end of the base layer filament and a line drawn perpendicular to the long axis centerline of the base.

DETAILED DESCRIPTION OF THE INVENTION

It will be understood that the drawings are intended to illustrate the invention and are not necessarily drawn to relative scale. Also, the drawings do not necessarily represent all aspects of the invention.

In several optical waveguide fiber applications the preferred fiber package is a filament pack wound on a bobbin. The fiber may remain on the bobbin throughout its use or the fiber may be stored on a bobbin for an extended time period and then unwound. In certain applications, such as bobbins wound for tethered weapons, unwinding speeds may exceed 200 meters per second.

To maintain the integrity of the filament pack, a base layer is wound on the bobbin. The base layer serves as a template which controls the pitch and spacing of the windings of the filament pack.

A base layer made of essentially the same material as the filament pack has been found to be superior in performance to the wire base layer used in the prior art.

In the instant invention, the base layer is made of optical waveguide glass and is coated with a polymer material substantially identical to the polymer coating of the optical waveguide which comprises the filament pack. Thus, under changes induced by temperature and humidity and by aging, the dimension changes of the base layer substantially track the dimension changes of the optical waveguides in the filament pack. The integrity of the filament pack is thereby maintained. That is, essentially no fissures appear in the filament pack and the spatial relationship of filament coils within a layer and of adjacent layers is, in general, maintained.

A cost benefit may be realized over the wire base layer art because the optical fiber base layer may be made of "scrap" optical fiber which has been rejected for defects other than those related to strength or dimension tolerances.

FIG. 1a shows a bobbin having spaced apart flanges 1 which limit the axial extent of the base layer and filament pack. The bobbin base layer 3 is wound on bobbin base 5. In general, the coils of base layer 3 are wound under sufficient tension to conform to the shape of base 5. The ends of the base layer 7 are fixedly attached to a part of the bobbin. FIG. 1a, shows ends 7 attached to the bobbin base. Attachment may also be made to other parts of the bobbin, such as the flanges or the inside surface of the base. Means for attaching the base layer ends include gluing, taping and mechanical means.

FIG. 1b illustrates a bobbin shape more suited for applications wherein the filament pack at some time will be unwound. Base 11 is tapered and the flange 9 is larger than flange 10. In general, the filament pack is unwound in a direction substantially aligned with the axial centerline of the base and towards the smaller flange 10.

The method of winding the base layer for bobbins 1a and 1b is generally the same.

FIG. 2 is a drawing of a bobbin base 19 having a partially wound base layer. The first contiguous coils 17 of the base layer filament are in place. The free end of the base layer filament 15 makes angle 13 with line 12 which is perpendicular to the long axis centerline of base 19. Angle 13 is maintained such that free end 15 diagonally intersects about five coils of the base layer on the bobbin base 19. Maintaining angle 13 insures that the coils of the base layer will lie in contiguous relation to one another. An angle 13 in the range of about 0.1° to 0.5° has been found to be suitable.

Methods for drawing and coating optical waveguide fiber, as described, for example, in U.S. Pat. No. 3,711,262, Keck, et al, and U.S. Pat. No. 4,792,347, Deneka, et al., are well known. Feedback loop parameters in the waveguide fiber draw and coating process can be set to produce a reasonably wide range of glass filament and polymer coating diameters with essentially no loss of tolerance control. Thus, the technology developed to produce optical waveguide fibers having high precision, low tolerance dimensions, meets the geometry requirements of a base layer filament. The inventive base layer does not carry a light signal, and therefore, considerable latitude is gained in selecting the fiber, as noted above. And, because bend loss is not an issue, the range of acceptable base layer wind tensions is broadened considerably.

EXAMPLE 1

An aluminum bobbin for use in a tethered weapon application was wound with the inventive base layer filament. The bobbin base had an axial dimension of about 30.5 cm. The bobbin base tapered from a diameter of about 13.4 cm to 11.4 cm. The larger end of the bobbin had a flange of diameter about 14.7 cm.

The filament of the base layer was drawn from a preform having a composition essentially identical to that of the preform of the optical fiber in the filament pack. The base layer filament was coated with a single layer of UV cured acrylate (Corning® designation—TA-20) chosen to be compatible in properties, as described above, with the dual layer UV cured acrylate coating (Corning® designation—CPC-5) of the waveguide fiber in the filament pack.

The diameter of the coated base layer filament was 248 microns, about 1.01 times the diameter of the coated filament of the filament pack.

Prior to winding the base layer, the aluminum bobbin base area, approximately 1190 $cm_2$, was substantially uniformly sprayed with about 20 ml of Lockbond 116 neoprene adhesive purchased from the Macklanburg Duncan Co. One end of the base layer filament was taped to the base surface at the large end of the base. About 444 meters of base layer filament were wound in a single layer onto the base, essentially covering the base from end to end. The wind tension was maintained constant at about 115 grams. The other end of the base layer filament was taped to the base surface at the narrow end of the base. During winding, the angle of the free end of the base layer filament was held at about 0.3° relative to the plane of the filament coils as illustrated in FIG. 2.

A filament pack 22.5 km in length was wound in 58 layers over the base layer. The wind pattern was the continuous back and forth overlap pattern well known in the art. The Lockbond® 116 neoprene adhesive was sprayed onto the filament layers between each layer. This adhesive aids in maintaining filament pack integrity on the bobbin during storage and during unwinding.

The filament pack remained on the bobbin for about 60 days. Shortly after winding was completed, the filament pack was subjected to two thermal cycle test regimens. In the 10 hour first cycle, the filament pack was brought from ambient conditions, about 25° C. to −32° C. The filament pack reached equilibrium in about 1 hour. After a low temperature hold period of about 1.5 hours, the filament pack was brought to 60° C. in about 2 hours and held at that temperature for about 1.5 hours. The filament pack was then returned to ambient temperature and equilibrated over a 4 hour period. A 16.75 hour thermal cycle test followed. The filament pack was first brought to 70° C. and held for about 10.5 hours. The pack was then brought to ambient temperature and equilibrated for about 1 hour before being lowered to −40° C. over a 1 hour period and held at the low temperature for about 1 hour. The temperature was then increased to −30° C. and held for about 2 hours after which the filament pack was brought to ambient temperature over about a 1 hour period. Humidity was not controlled during the cycling tests. Optical Time Domain Reflectometer (OTDR) measurements taken before and after winding, before and after testing, and during the high and low temperature parts of the thermal cycles showed essentially no induced attenuation. Also, visual inspection of the filament pack indicated essentially no change in the integrity of the filament pack wind. The remaining storage time on the bobbin was at ambient temperature and humidity.

At the end of the storage period, the filament pack was brought to a temperature of about −32° C. and unwound axially over the narrow end of the bobbin at about 213 m/s.

About 20.9 km of the filament pack unwound smoothly from the bobbin, without breaking or tangling. The test was terminated at the point where 20.9 km had been unwound.

EXAMPLE 2

A base layer was applied to the base of a bobbin constructed of a composite material. The coated diameter of the base layer filament was 249.8 microns. The base layer filament diameter was 1.01 times the diameter of the fiber in the filament pack. All materials used and conditions of winding the base layer and the filament pack were essentially identical to those of example 1.

Because the composite bobbin was slightly longer in the axial direction and larger in diameter than the aluminum bobbin, 544 meters of base layer filament was applied to the base. Also, 30 ml/layer of Lockbond® 116 adhesive was used.

Using the procedure of example 1, a filament pack of length 22 km was wound over the base layer.

The filament pack remained 45 days on the bobbin, the initial time period spent in thermal cycle as in example 1. Again OTDR measurements and visual inspection before, during and after testing showed excellent filament pack integrity was maintained throughout testing.

The bobbin was unwound at −36° C. at a 244 m/s rate.

A length of about 21.6 km of filament was successfully unwound from the bobbin before the test was terminated.

Thus, the inventive base layer provides a foundation for the filament pack which so closely matches the characteristics and properties of the filament pack, that the filament pack remains stable under a wide range of environmental conditions. The long term integrity of the filament pack using the inventive base layer is verified by the unwinding tests of the examples above.

Although specific embodiments of this invention have hereinbefore been disclosed and described, it will be understood that the scope of this invention is nevertheless to be defined by the following claims.

What is claimed is:

1. A winding bobbin having a base for holding a wound filament pack, having a thickness and an axial dimension and having means, spaced apart and fixedly positioned on said base, of limiting the axial dimension of said filament pack, comprising:
    a wound base layer filament comprising a glass filament, coated with at least one layer of resilient material wherein the wound base layer filament is optically separated from the filament of the wound filament pack.

2. The bobbin of claim 1 wherein the target diameter of said base layer filament is chosen to be in the target range of 1.005 and 1.10 times the diameter of a filament of said filament pack.

3. The bobbin of claim 2 wherein the diameter of said base layer filament is between 1.01 and 1.02 times the diameter of a filament of said filament pack.

4. The bobbin of claim 3 wherein the diameter of said base layer filament is within the range of −6% to +6% of the target diameter of said base layer filament.

5. The bobbin of claim 1 wherein at least the outer resilient coating of said base layer filament is a polymer having a modulus between 500 and 1800 MPa.

6. The bobbin of claim 5 wherein the polymer coating is a UV cured acrylate material.

7. The bobbin of claim 1—further comprising a filament pack—wherein the thermal expansion coefficient of said base layer essentially matches the thermal expansion coefficient of the filament of said filament pack.

8. The bobbin of claim 1 wherein the percent change in diameter, due to absorption or desorption of a fluid, of said base layer essentially matches the same as the percent change in diameter of the filament of said filament pack, due to absorption or desorption of a fluid.

* * * * *